No. 842,389. PATENTED JAN. 29, 1907.
F. A. DECKER.
BATTERY.
APPLICATION FILED FEB. 27, 1904.
3 SHEETS—SHEET 1.
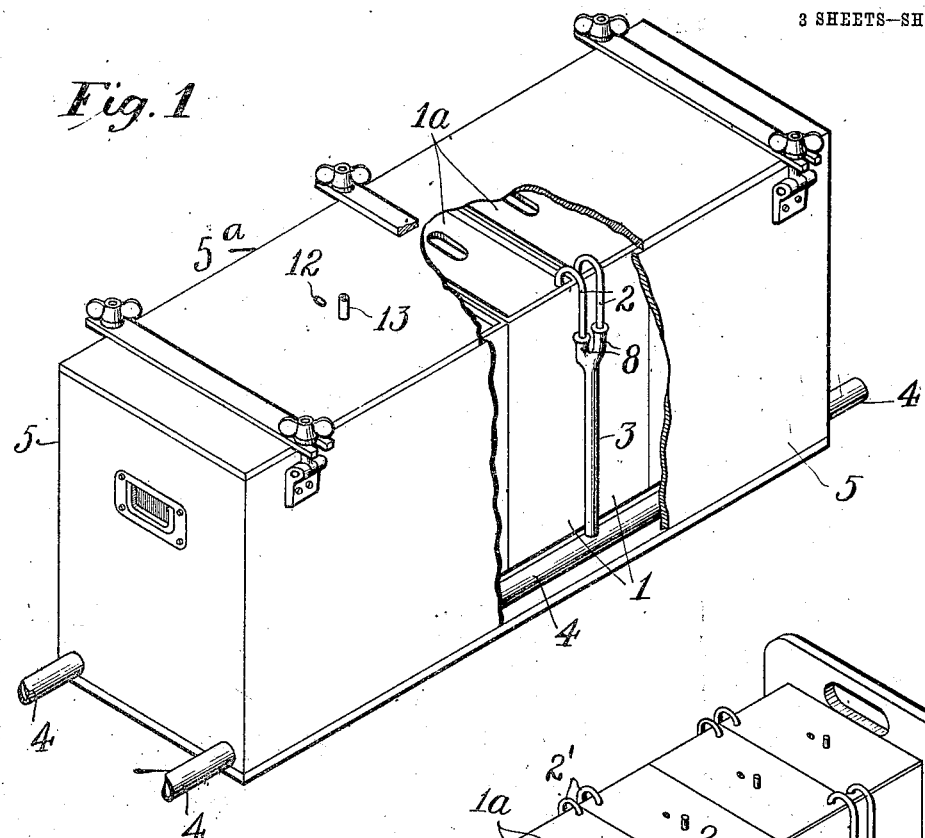
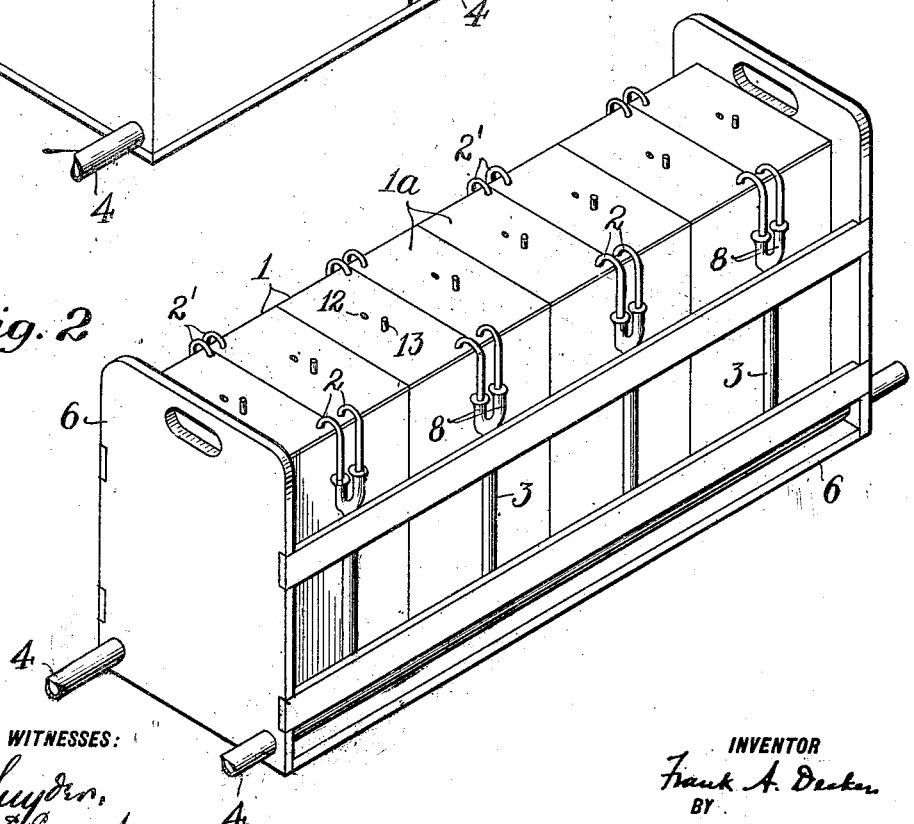
WITNESSES:
INVENTOR
Frank A. Decker
BY
Charles N. Butler
ATTORNEY.

No. 842,389. PATENTED JAN. 29, 1907.
F. A. DECKER.
BATTERY.
APPLICATION FILED FEB. 27, 1904.
3 SHEETS—SHEET 2.
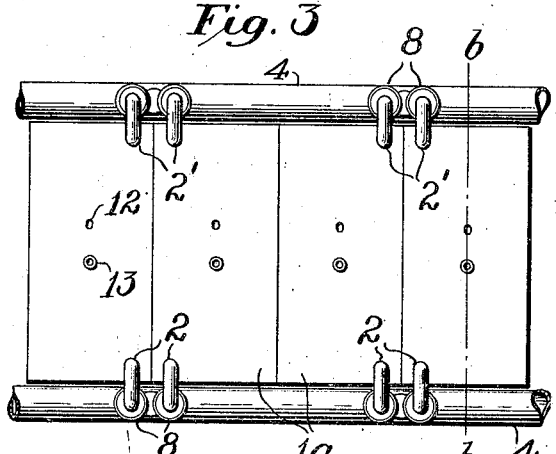
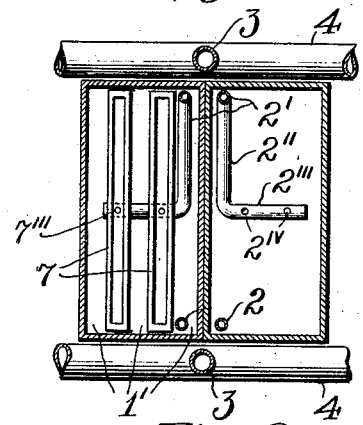
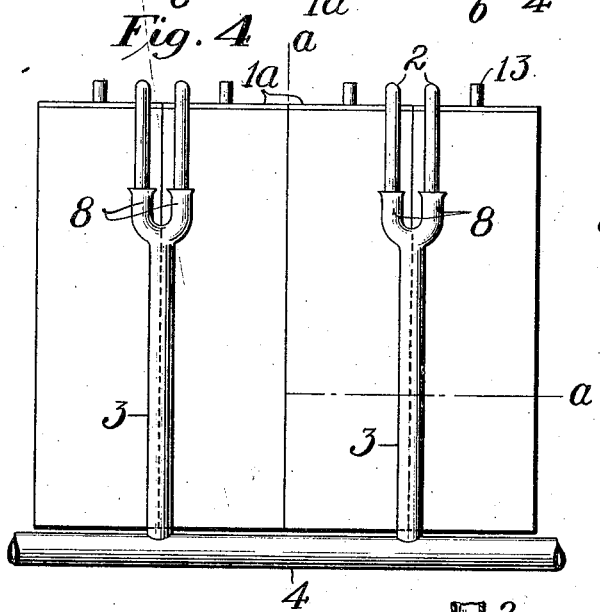
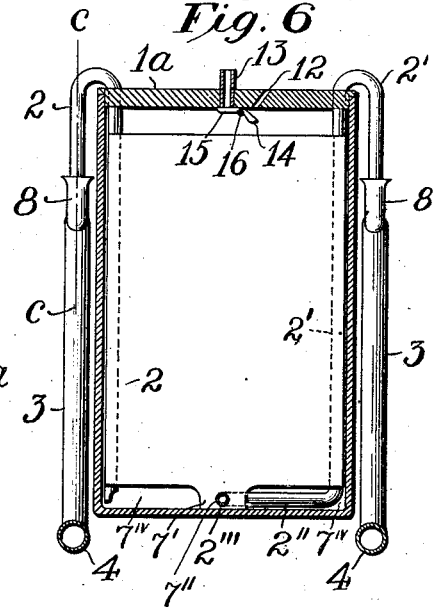
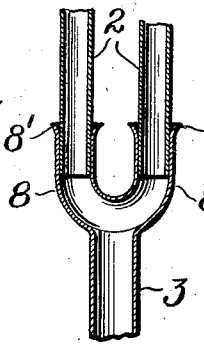
WITNESSES:
INVENTOR
Frank A. Decker
BY
Charles N. Butler
ATTORNEY.

No. 842,389. PATENTED JAN. 29, 1907.
F. A. DECKER.
BATTERY.
APPLICATION FILED FEB. 27, 1904.
3 SHEETS—SHEET 3.
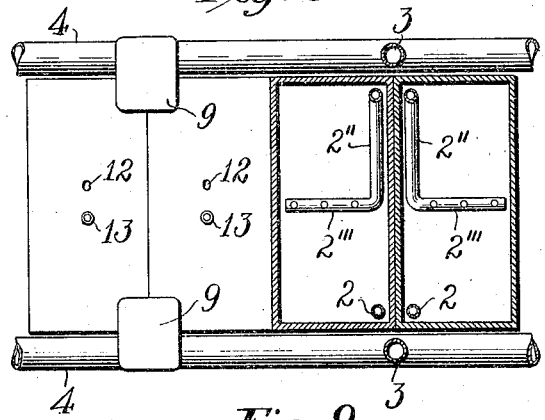
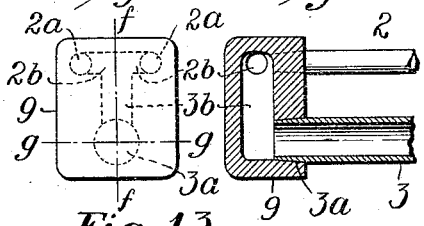
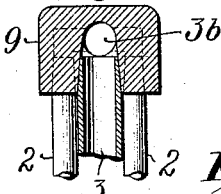
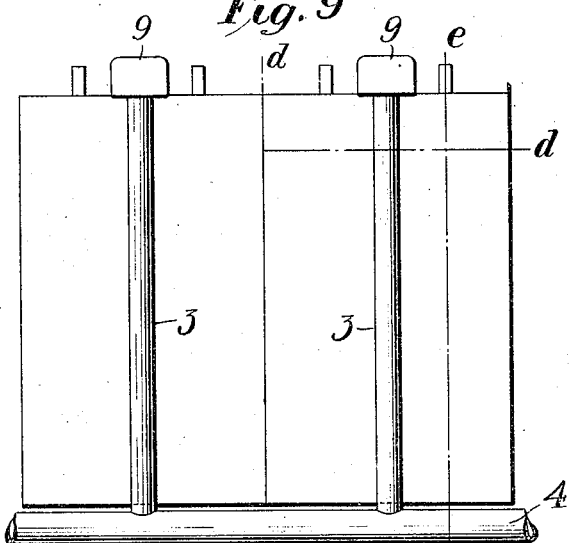
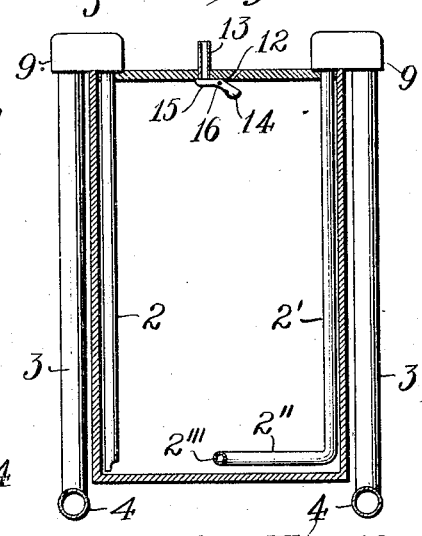
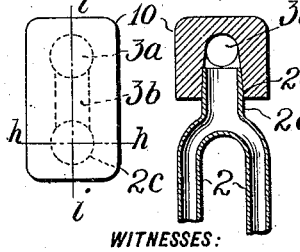
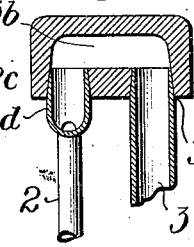
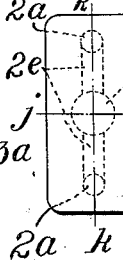
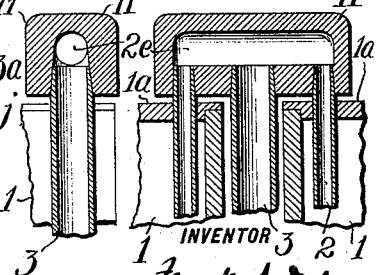
WITNESSES:
INVENTOR
Frank A. Decker
BY
Charles N. Butler
ATTORNEY.

UNITED STATES PATENT OFFICE.

FRANK A. DECKER, OF PHILADELPHIA, PENNSYLVANIA, ASSIGNOR, BY MESNE ASSIGNMENTS, TO DECKER ELECTRICAL MANUFACTURING COMPANY, OF WILMINGTON, DELAWARE.

BATTERY.

No. 842,389.

Specification of Letters Patent.

Patented Jan. 29, 1907.

Application filed February 27, 1904. Serial No. 195,694.

*To all whom it may concern:*

Be it known that I, FRANK A. DECKER, a citizen of the United States, residing at Philadelphia, in the county of Philadelphia and State of Pennsylvania, have invented certain Improvements in Batteries, of which the following is a specification.

The leading objects of my invention are to provide improved mechanism adapted for readily filling and emptying a nest of battery-cells, to permit the ready removal and replacement of the several cells, and to prevent leakage of current or its passage from one cell to the other, either through the supply-conduit or the battery fluid contained therein. These objects are attained by providing a suitable casing for holding the cells in their proper relation, employing a peculiar supplying and discharge system having improved couplings whereby the several cells may be removed and replaced without disturbing the conduits therefor, and connecting the several cells with the supply and discharge system by conduits of non-conducting material having calibers and lengths such that the fluid contained therein affords sufficient resistance to prevent material electrical leakage therethrough.

The characteristic features of the invention are fully set forth in the following description and the accompanying drawings in illustration thereof, of which—

Figure 1 represents a perspective view, partially in section, of an embodiment of the improvements with a closed casing. Fig. 2 represents a perspective view of the improvements adapted for use with an open casing or holder. Fig. 3 represents a top plan view of a group of cells with a section of the supply and discharge system shown in Fig. 2. Fig. 4 represents a side elevation of the construction shown in Fig. 3. Fig. 5 represents a horizontal section taken on the line $a\,a$ of Fig. 4, showing a cell containing cups and a cell having the cups removed therefrom. Fig. 6 represents a vertical section taken on the line $b\,b$ of Fig. 3. Fig. 7 represents a vertical section taken on the line $c\,c$ of Fig. 6. Fig. 8 represents a top plan and horizontal sectional view on the line $d\,d$ of Fig. 9, showing a group of cells with a section of the supply and discharge system therefor having a modified form of coupling. Fig. 9 represents a side elevation of the construction illustrated in Fig. 8. Fig. 10 represents a vertical section taken on the line $e\,e$ of Fig. 9. Fig. 11 represents an enlarged top plan view of the coupling used in the construction shown in Figs. 8 to 10, inclusive. Fig. 12 represents a sectional view taken on the line $f\,f$ of Fig. 11. Fig. 13 represents a sectional view taken on the line $g\,g$ of Fig. 11. Fig. 14 represents a top plan view of an additional form of coupling. Fig. 15 represents a sectional view taken on the line $h\,h$ of Fig. 14. Fig. 16 represents a sectional view taken on the line $i\,i$ of Fig. 14. Fig. 17 represents a top plan view of a further modification in the form of the coupling. Fig. 18 represents a sectional view taken on the line $j\,j$ of Fig. 17, and Fig. 19 represents a sectional view taken on the line $k\,k$ of Fig. 17.

Referring to the drawings, the battery comprises a nest of cells 1, each having the ducts 2 and 2' communicating therewith and with the branch conduits 3, connected with the main conduits 4, the whole being carried by a tight casing 5, as shown in Fig. 1, or in an open casing 6, as shown in Fig. 2.

The cells 1, having the cups 7 therein, are preferably adapted to fit closely together in their casing and are severally rendered readily removable and replaceable by means of the unions 8, having the flared or tapered openings 8', in which the ends of the ducts 2 and 2' closely fit in frictional relation to form connections with the conduits 3 and 4, these conduits being undisturbed by the changing of the cells, since the bifurcated terminals of the conduits 3, forming the unions 8, permit the ready movement of the ends of the ducts 2 and 2' relatively thereto. The joints formed by this coupling may be rendered tight in any suitable way, as by running paraffin or asphalt into the flared openings 8'.

The ducts 2 and 2' may be made of any suitable non-conducting material, as hard rubber, glass, or porcelain, and constructed of sufficient length and of such small caliber that the fluid they contain will offer a sufficiently high resistance to prevent objectionable leakage of current therethrough. The ducts are preferably carried down to the bottoms of the cells through the lids or covers 1ª, the ducts 2 terminating in the communicating cell-compartments 1' and the ducts 2' communicating with the interiors of the cups 7. Each duct 2' is provided with a bend 2'' and an arm 2''', having apertures $2^{iv}$ therein, and each cup is provided with a base extension 7', having an aperture 7'', through which the arm 2''' passes, and an aperture 7''', with which the aperture $2^{iv}$ communicates. The base extensions provide the passages $7^{iv}$, through which free circulation between the bottoms of the several compartments is established.

In the form of coupling shown in Figs. 8 to 13, inclusive, the union 9, suitably made of soft rubber, has the tapered socket $3^a$ for receiving the tapered end of the conduit 3 and the tapered sockets $2^a$ for receiving the tapered ends of the ducts, as 2, the several sockets being connected by the passages $2^b$ and $3^b$.

In the form of coupling shown in Figs. 14 to 16, inclusive, the union 10 has the tapered sockets $2^c$ and $3^a$, connected by the passage $3^b$, the socket $2^c$ receiving the tapered hollow stem $2^d$, by which the ducts, as 2, are connected, and the socket $3^a$ receiving the tapered end of the conduit 3.

In the form of coupling shown in Figs. 17 to 19, inclusive, the union 11 has the tapered sockets $2^a$ and $3^a$, connected by the passage $2^e$, the sockets $2^a$ receiving the tapered ends of the ducts, as 2, and the socket $3^a$ receiving the tapered end of the conduit 3, which lies between the ducts 2 and the cells 1.

The several cells may be provided with the gas-vents 12 and the air-ports 13, controlled by a valve comprising the angularly-arranged wings 14 and 15, rocking on the pivot 16 and adapted for closing the respective openings 12 and 13. The valve is weighted, so that the vent is normally maintained opened to permit escape of gas, and the port is normally maintained closed to cut off communication from the cell therethrough. When a blowing device is connected with the air-port and air forced therethrough to discharge the fluid from the cells through the conduits, the rocking of the valve effected thereby closes the vent.

In using the tight casing 5 the cells may be made to communicate freely therewith, while the casing-lid $5^a$ may be provided with the gas-vent 12 and the air-port 13, controlled by the valve 14 15.

It will now be understood that the resistance-ducts prevent electrical leakage during operation and that the cells and cups or compartments may readily be filled through the conduits 4, 3, 2, and 2' and emptied therethrough by suction or by air-pressure communicated through the air-port, while any cell may readily be removed or replaced without disturbing the remainder of the system.

Having described my invention, I claim—

1. A battery comprising a plurality of cells, a duct extending into the interior of each of said cells, a conduit communicating with a plurality of said ducts, and means for connecting said conduit to said ducts, said connection permitting the removal of said cells and ducts without moving said conduit, substantially as specified.

2. A battery comprising a plurality of cells, a duct extending into the interior of each of said cells, a main conduit, a plurality of branch conduits each communicating with said main conduit and with a plurality of said ducts, and means for removing and replacing the respective cells and their ducts independently of the remaining cells and their connections, substantially as specified.

3. A battery having an inclosed cell, a vent leading therefrom, a port leading thereto, and a pivoted valve which normally closes said port and opens said vent, said valve being moved by pressure to open said port and simultaneously close said vent, substantially as specified.

4. A battery having a cell, a plurality of apertures communicating therewith, and a pivoted valve having angular wings adapted respectively for covering said apertures alternately, said valve being weighted to maintain one of said apertures closed and the other open, substantially as specified.

5. A battery having a plurality of cells, a closed casing containing said cells, a plurality of apertures in said casing, and a valve which covers said apertures alternately, substantially as specified.

6. A battery-cell, a duct communicating with said cell, and a conduit communicating with said duct, said conduit having a flared terminal adapted for engaging the end of said duct, substantially as specified.

In testimony whereof I have hereunto set my hand, this 6th day of January, 1904, in the presence of the subscribing witnesses.

FRANK A. DECKER.

Witnesses:
JOHN THIEL,
UTLEY E. CRANE, Jr.